(12) United States Patent
Agarwal et al.

(10) Patent No.: US 7,610,510 B2
(45) Date of Patent: Oct. 27, 2009

(54) METHOD AND APPARATUS FOR TRANSACTIONAL FAULT TOLERANCE IN A CLIENT-SERVER SYSTEM

(75) Inventors: Anurag Agarwal, Pune (IN); Dharmesh Shah, San Jose, CA (US); Nagaraj Kalmala, Sunnyvale, CA (US); Neelakandan Panchaksharam, Pune (IN); Rajeev Bharadhwaj, Saratoga, CA (US); Sameer Lokray, Cupertino, CA (US); Srikanth Sm, Pune (IN); Thomas Bean, West Columbia, SC (US)

(73) Assignee: Symantec Corporation, Mountain View, CA (US)

( * ) Notice: Subject to any disclaimer, the term of this patent is extended or adjusted under 35 U.S.C. 154(b) by 428 days.

(21) Appl. No.: 11/707,441

(22) Filed: Feb. 16, 2007

(65) Prior Publication Data

US 2008/0201602 A1    Aug. 21, 2008

(51) Int. Cl.
*G06F 11/00* (2006.01)
(52) U.S. Cl. .......................... 714/12; 714/13
(58) Field of Classification Search .................. 714/12, 714/13, 18
See application file for complete search history.

(56) References Cited

U.S. PATENT DOCUMENTS

| 5,812,748 | A | 9/1998 | Ohran et al. |
|---|---|---|---|
| 5,922,078 | A | 7/1999 | Hirayama et al. |
| 5,991,771 | A * | 11/1999 | Falls et al. .................. 707/202 |
| 6,182,086 | B1 * | 1/2001 | Lomet et al. ................. 707/202 |
| 6,230,282 | B1 * | 5/2001 | Zhang ........................... 714/6 |
| 6,247,141 | B1 * | 6/2001 | Holmberg ...................... 714/2 |
| 7,308,607 | B2 * | 12/2007 | Reinhardt et al. ............. 714/25 |
| 7,383,407 | B1 * | 6/2008 | Kiselev ...................... 711/162 |
| 2002/0099973 | A1 * | 7/2002 | Moser et al. .................. 714/11 |
| 2005/0102396 | A1 * | 5/2005 | Hipp .......................... 709/224 |
| 2005/0198327 | A1 * | 9/2005 | Iwamura et al. ............. 709/229 |
| 2007/0083645 | A1 * | 4/2007 | Roeck et al. ................. 709/224 |

OTHER PUBLICATIONS

International Search Report and Written Opinion mailed on Jun. 26, 2008 for PCT Application No. PCT/ US2008/002032.
Gengbin Zheng et al., "FTC-Charm++: An In-Memory Checkpoint-Based Fault Tolerant Runtime for Charm++ and MPI," 2004 IEEE International Conference on Cluster Computing, New York: IEEE, 2004, pp. 93-103, ISSN 1552-5244.

* cited by examiner

*Primary Examiner*—Marc Duncan
(74) *Attorney, Agent, or Firm*—Moser IP Law Group (57) ABSTRACT

Method and apparatus for transactional fault tolerance in a client-server system is described. In one example, output data generated by execution of a service on a primary server during a current epoch between a first checkpoint and a second checkpoint is buffered. A copy of an execution context of the primary server is established on a secondary server in response to the second checkpoint. The output data as buffered is released from the primary server in response to establishment of the copy of the execution context on the secondary server.

20 Claims, 5 Drawing Sheets

METHOD AND APPARATUS FOR TRANSACTIONAL FAULT TOLERANCE IN A CLIENT-SERVER SYSTEM

BACKGROUND OF THE INVENTION

1. Field of the Invention

Embodiments of the invention generally relate to fault tolerant systems and, more specifically, to a method and apparatus for transactional fault tolerance in a client-server system.

2. Description of the Related Art

Many different approaches to fault-tolerant computing are known in the art. Fault tolerance is the ability of a system to continue to perform its functions, even when one or more components of the system have failed. Fault-tolerant computing is typically based on replication of components and ensuring for equivalent operation between the components. Fault-tolerant systems are typically implemented by replicating hardware, such as providing pairs of servers, one primary and one secondary. One type of fault tolerant mechanism involves each of the servers executing the same software. The replicated software is arranged to operate in lockstep during normal operation and a mechanism is provided to detect a failure of lockstep. Another approach involves periodic snapshots with logging and replay of events after failover. However, any approach that requires replay of events after a failover or one that requires primary and secondary servers to execute in lockstep involves solving complex issues dealing with deterministic replay of instructions on the secondary server. The problem is exacerbated in multi-processor systems. Accordingly, there exists a need in the art for a fault tolerant system that does not require logging and replay or lockstep execution.

SUMMARY OF THE INVENTION

Method and apparatus for transactional fault tolerance in a client-server system is described. In one embodiment, output data generated by execution of a service on a primary server during a current epoch between a first checkpoint and a second checkpoint is buffered. A copy of an execution context of the primary server is established on a secondary server in response to the second checkpoint. The output data as buffered is released from the primary server in response to establishment of the copy of the execution context on the secondary server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
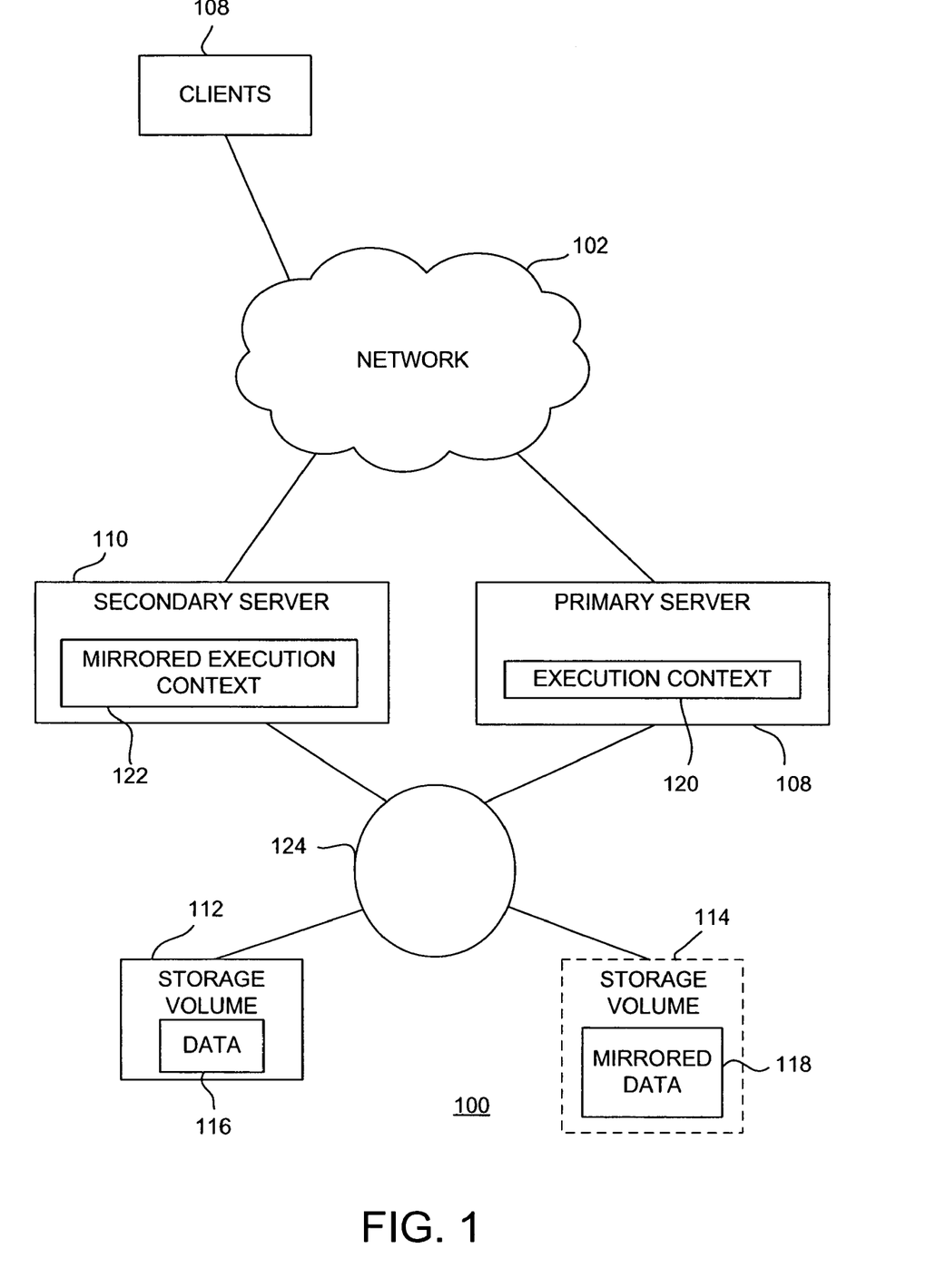
FIG. 1 is a block diagram depicting an exemplary embodiment of a fault tolerant system in accordance with one or more aspects of the invention.

FIG. 1 is a block diagram depicting an exemplary embodiment of a fault tolerant system 100 in accordance with one or more aspects of the invention. The system 100 includes a network 102, clients 104, and a server cluster 106. In the present example, the server cluster 106 includes servers 108 and 110. The server 108 is referred to as the "primary server" and the server 110 is referred to as the "secondary server." By "primary" it is meant that the server 108 nominally provides services to the clients 104 via the network 102. By "secondary" it is meant that the server 110 provides servers to the clients 104 in case the primary server 108 fails (i.e., is unable to provide such services due to hardware and/or software failure). Those skilled in the art will appreciate that the server cluster 106 may include more than two servers, some of which may be primary servers and others of which may be secondary servers.

The clients 104 are configured to communication with the server cluster 106 via the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. The clients 104 comprise various types of computers, such as laptops, desktop computers, workstations, and the like. The servers 108 and 110 host at least one service for the clients 104, such as an e-mail service, a database service, or the like. The servers 108 and 110 may be implemented using any type of computer systems capable of hosting service(s) for the clients 104.

The primary server 108 and the secondary server 110 are coupled to a network 124, such as a storage area network (SAN). In one embodiment, the primary server 108 manages a storage volume 112, and the secondary server 110 manages a storage volume 114. The storage volumes 112 and 114 comprise any type of block-based storage area coupled to the network 124. The storage volumes 112 and 114 may be implemented using any type of storage system or storage systems, such as a disk drive system. A disk drive system may include, for example, one or more storage disks, e.g., an array of storage disks or redundant array of storage disks. In another embodiment, the primary server 108 and the secondary server 110 have shared access to the storage volume 112.

The primary server 108 is configured to provide one or more services for use by the clients 104. The primary server 108 stores data 116 related to such service(s) in the storage volume 112. The secondary server 110 is also configured to provide the same service(s) as the primary server 108. In one embodiment, the secondary server 110 stores mirrored data 118 in the storage volume 114. The mirrored data 118 is a copy of the data 116 stored in the storage volume 112. Alternatively, the secondary server 110 may be configured for shared access the data 116 in the storage volume 112, obviating the need to maintain the mirrored data 118.

Before failover, the clients 102 do not interact with the secondary server 110. The primary server 108 is configured to copy or "mirror" its execution context 120 to the secondary server 110 at particular instants in time. Thus, the secondary server 110 maintains a mirrored execution context 122. This mirroring process is referred to herein as "checkpointing". The instants in time when the primary server 108 mirrors its execution context are referred to as checkpoints. When the execution context is mirrored, a checkpoint is committed to the secondary server 110. The intervals between checkpoints are referred to as epochs. The execution context includes information required to bring software and hardware of the secondary server 110 into the same logical state as the software and hardware of the primary server 108 at a given checkpoint.

In a client-server model, the client (either computer system or client process) does not have access to either the internal state of the server or the server storage volume. The client and server communicate exclusively over the network. Thus, a client can know about server state changes only through the network output generated by the server. For example, a database client can only know if a transaction has been committed when the database server sends the response to the request. As described below, this output based state change model between the clients and the server can be used to achieve fault tolerance.

In one embodiment, the primary server 108 buffers output data generated by each service during each epoch. In one embodiment, the output data comprises network output that includes network packets to be transmitted to the clients 104 via the network 102. Once a checkpoint is committed to the secondary server 110, the primary server 108 releases the output data that was buffered during the epoch prior to the checkpoint. When a client 104 receives output data from the primary server 108, the state of the primary server 108 has already been checkpointed (i.e., mirrored to the secondary server 110). Thus, the clients 104 only observe the primary server 108 change state from one checkpoint to the next. In other words, the fault tolerance is transactional from one checkpoint to the next.

In one embodiment, the checkpointing operation is atomic. That is, the checkpointing operation either succeeds or fails at once and there is no possible in-between state that is accessible. During a checkpointing operation, the primary server 108 temporally pauses execution in order to provide a consistent execution state that can be mirrored onto the secondary server 110. That is, the execution state of the primary server 108 does not change while it is being mirrored onto the secondary server 110. Given an atomic checkpointing operation, a failure at the primary server 108 (e.g., hardware and/or software failure) will always occur between two checkpoints. The state of the primary server 108 known to the clients 104 at the time of failure would be as of the last committed checkpoint, which is exactly the state that is mirrored at the secondary server 110. After the failure, the secondary server 110 resumes execution of the service(s) from the last checkpoint. Such execution by the secondary server 110 may or may not proceed as if performed by the primary server 108 (i.e., the execution trace at the secondary server 110 may or may not be identical to the primary server 108). The clients 104, however, are not aware of any change in execution. From the point-of-view of the clients 104, the server cluster 106 moves from one consistent state to another, even after a failure of one of the servers.

Since the fault tolerance process described above does not require deterministic logging and replay of events, it offers a number of advantages over alternative approaches. The fault tolerance process described above does not require intercepting and logging of any events that can alter the execution trace of the primary server 108. In addition, after a failover, there is nothing to replay, which makes for potentially faster resumption of a service. The fault tolerance process does not require any specific hardware support, nor does it require any changes to application software. Furthermore, the fault tolerance process does not require any change in any protocol used between the clients 104 and the server cluster 106.

As described above, fault tolerance is achieved by buffering network output sent to the clients 104 until the state of the primary server 108 is checkpointed. In most cases, delaying the network packets even for a short duration can substantially affect the client performance and affect throughput. For example, in transmission control protocol/internet protocol (TCP/IP), given 32 KB of TCP window size and a checkpoint every 1 millisecond (ms), the effective throughput of a 1 Gbps link is reduced to about 256 Mbps for a single TCP connection. Thus, the amount of time for which the network packets is delayed should account for client performance and throughput. In one embodiment, for TCP/IP, the duration of the epochs between checkpoints is 1 ms or less. Those skilled in the art will appreciate that other durations may be used depending on network parameters that may be the same or different than the examples above.

Figure 2:
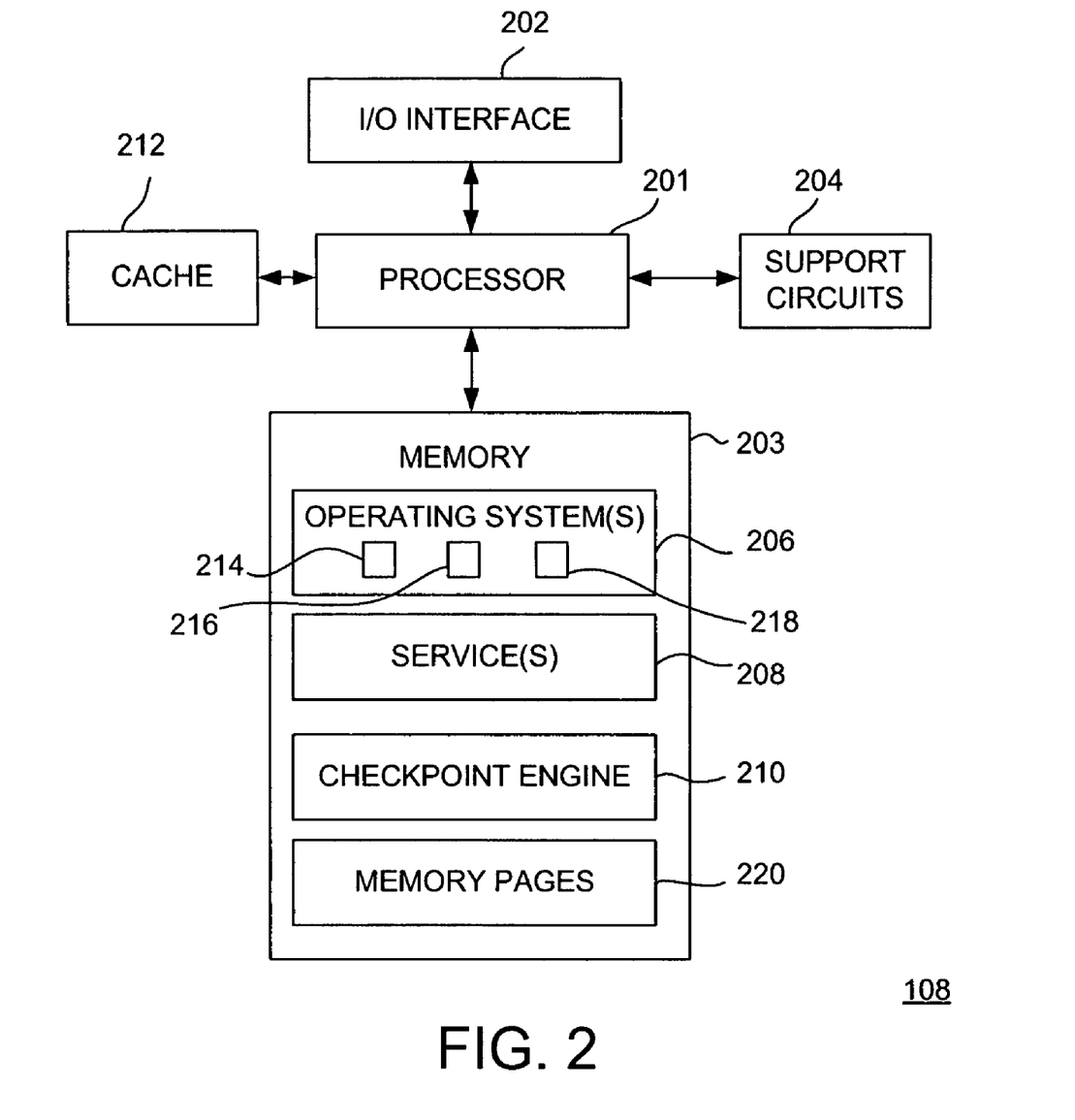
FIG. 2 is a block diagram depicting an exemplary embodiment of a primary server in accordance with one or more aspects of the invention.

FIG. 2 is a block diagram depicting an exemplary embodiment of the primary server 108 in accordance with one or more aspects of the invention. The primary server 108 includes a processor 201, memory 203, various support circuits 204, and an I/O interface 202. The processor 201 may include one or more microprocessors known in the art. The support circuits 204 for the processor 201 include conventional cache, power supplies, clock circuits, data registers, I/O interfaces, and the like. The I/O interface 202 may be directly coupled to the memory 203 or coupled through the processor 201. The I/O interface 202 is also configured for communication with the network 102 and with the network 124. The I/O interface 202 may also be coupled to other types of input and output devices (e.g., mouse, keyboard, display, etc). The I/O interface 202 may further be coupled directly to an I/O interface of the secondary server 110 or through the network 124. The primary server 108 may also include a cache 212 for caching data intended to be stored on the storage volume 112. The cache 212 may comprise non-volatile random access memory (NVRAM) or like type cache memory known in the art.

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 include one or more services 208 and a checkpoint engine 210. The service(s) 208 may be any type of program, such as an e-mail service or a database service. The primary server 108 may be programmed with one or more operating systems 206, which may include OS/2, Java Virtual Machine, Linux, Solaris, Unix, Windows, Windows95, Windows98, Windows NT, and Windows2000, WindowsME, and WindowsXP, Windows Server, among other known platforms. The memory 203 may include one or more of the following random access memory, read only memory, magneto-resistive read/write memory, optical read/write memory, cache memory, magnetic read/write memory, FLASH memory, and the like, as well as signal-bearing media as described below.

The service(s) 208 interface with various sub-systems, including a networking sub-system 214, a storage sub-system 216, and a virtual memory sub-system 218. The sub-systems 214, 216, and 218 are illustratively shown as part of the operating system(s) 206. The networking sub-system 214 is configured to control networking functions, such as providing a TCP/IP stack, providing a driver for a network interface in the I/O interface 202, and the like. The storage sub-system 216 is configured to control storage and retrieval of data from the storage volume 112 and the cache 212. The virtual memory sub-system 218 is configured to control storage of data in the memory 203.

Figure 3:
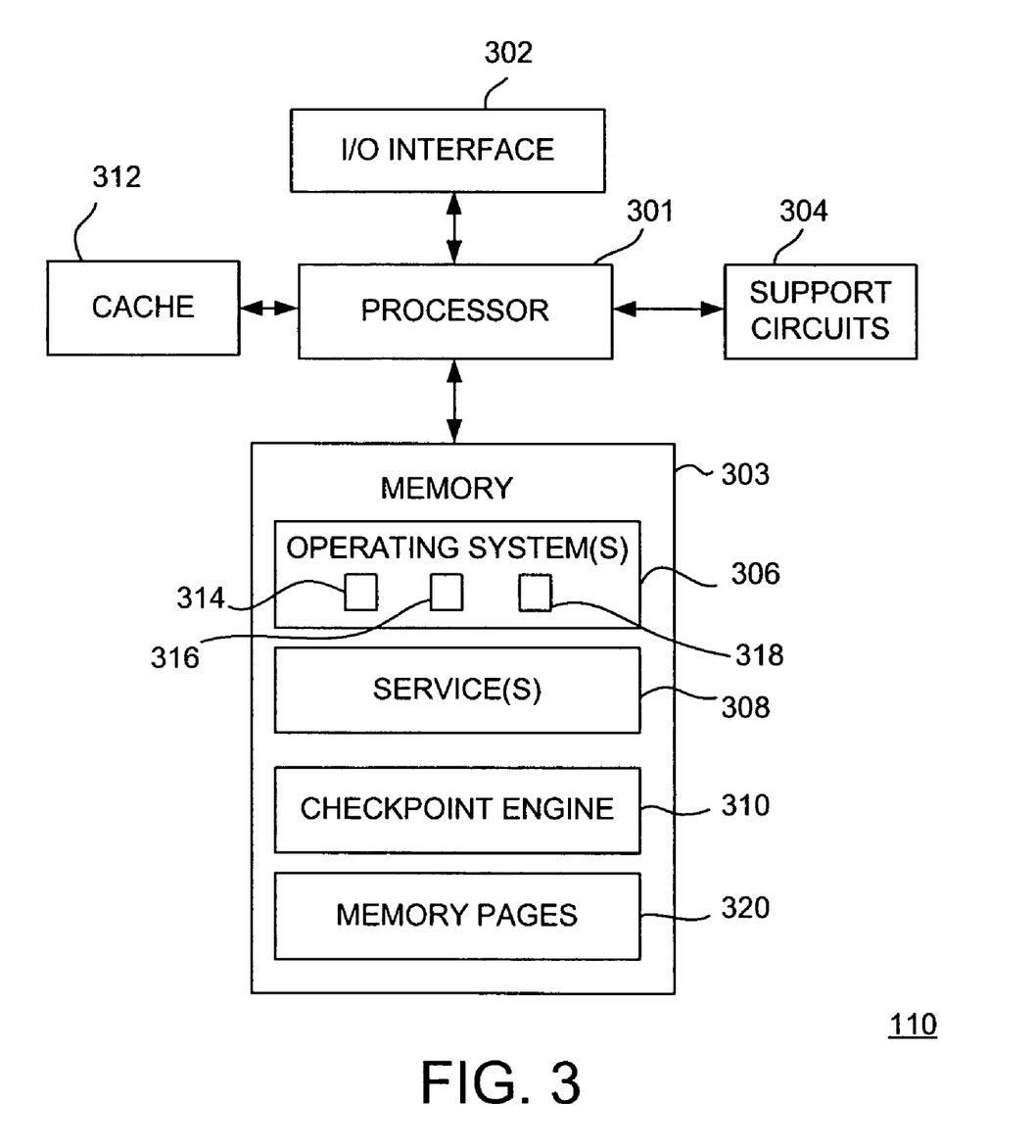
FIG. 3 is a block diagram depicting an exemplary embodiment of a secondary server in accordance with one or more aspects of the invention.

FIG. 3 is a block diagram depicting an exemplary embodiment of the secondary server 110 in accordance with one or more aspects of the invention. Since the secondary server 110 mirrors the execution context of the primary server 108, the secondary server 110 is similar to the primary server 108. The secondary server 110 includes a processor 301, memory 303, various support circuits 304, and an I/O interface 302. The processor 301 may include one or more microprocessors known in the art. The support circuits 304 for the processor 301 include conventional cache, power supplies, clock circuits, data registers, I/O interfaces, and the like. The I/O interface 302 may be directly coupled to the memory 303 or coupled through the processor 301. The I/O interface 302 is also configured for communication with the network 102 and with the network 124. The I/O interface 302 may also be coupled to other types of input and output devices (e.g., mouse, keyboard, display, etc). The I/O interface 302 may further be directly coupled to the I/O interface 202 of the primary server 108 or through the network 124. The transfer of data for mirroring the execution context of the primary server 108 onto the secondary server 110 may be made over a link between the I/O interfaces 202 and 302 (or through the network 124).

The memory 303 stores processor-executable instructions and/or data that may be executed by and/or used by the processor 301. These processor-executable instructions may comprise hardware, firmware, software, and the like, or some combination thereof. Modules having processor-executable instructions that are stored in the memory 303 include one or more services 308 and a checkpoint engine 310. The service(s) 308 are identical to the service(s) 208 on the primary server 108. The secondary server 110 may be programmed with one or more operating systems 306 similar to the operating system(s) 206. The operation systems 306 also include a networking sub-system 314, a storage sub-system 316, and a virtual memory sub-system 318 similar to the operating systems 206. The memory 303 may include one or more of the following random access memory, read only memory, magneto-resistive read/write memory, optical read/write memory, cache memory, magnetic read/write memory, FLASH memory, and the like, as well as signal-bearing media as described below.

Referring to FIGS. 1-3, the checkpoint engine 210 and the checkpoint engine 310 cooperate to provide a fault tolerant system. The checkpoint engines 210 and 310 form part of a distributed application for controlling checkpoint operations and failover for the primary server 108 and the secondary server 110.

Assume the primary server 108 is operating nominally. During an epoch, the primary server 108 executes the service(s) 208 for the clients 104. The service(s) 208 make use of various sub-systems, including the networking sub-system 214, the storage sub-system 216, and the virtual memory sub-system 218. In one embodiment, the networking sub-system 214 delivers input data (e.g., input network packets from the clients 104) to the service(s) 208 as the input data is received (i.e., in normal fashion). The networking sub-system 214 buffers output data produced by the service(s) 208. As discussed above, output data is not transmitted until a checkpoint is committed to the secondary server 110. The storage sub-system 216 handles read requests from the service(s) 208 in normal fashion. In some embodiments, the storage sub-system 216 caches write requests in the cache 212, rather then writing the data directly to the storage volume 112. The virtual memory sub-system 218 manages memory pages 220 used by the service(s) 208. The virtual memory sub-system 218 is configured to keep track of which of the pages 220 has been modified by the service(s) 208 during the current epoch (referred to as "dirty pages").

A checkpoint can be performed at the end of a fixed interval, based on a trigger, or a combination of timeout and trigger mechanisms. An exemplary triggering event may be the output data in the buffer reaching a threshold level. The checkpoint engines 210 and 310 perform checkpointing for each of the sub-systems 214, 216, and 218. In particular, the virtual memory sub-system 218 initially copies all of the pages 220 to the secondary server 110 (i.e., as a result of the first checkpoint) to establish pages 320. For subsequent checkpoints, the virtual memory sub-system 218 only copies the pages that have changed since the previous checkpoint (dirty pages) to the secondary server 110. In one embodiment, the virtual memory sub-system 218 may be configured to copy dirty pages to the secondary server 110 throughout an epoch, rather than copy all of the dirty pages at a checkpoint. Whether the dirty pages are copied continuously or at a checkpoint, only those pages that were modified in the previous epoch are copied to the secondary server 110. The dirty pages are only committed at the secondary server 110 when a successful checkpoint occurs. That is, any dirty pages copied to the secondary server 110 during an epoch are intermediate in nature and are not committed to the secondary server 110 until completion of a successful checkpoint.

On a successful checkpoint, the storage sub-system 216 makes permanent all the changes to it since the previous checkpoint. That is, all the data that was generated during the previous epoch and stored in the cache 212 is written to the storage volume 112. In one embodiment, such data is also mirrored on the storage volume 114. In one embodiment, similar to the virtual memory sub-system 218, the storage sub-system 216 mirrors the cache 212 at the secondary server 110 during the epoch. When a checkpoint is reached, the primary server 108 and the secondary server 110 commit the write-requests. For example, the primary server 108 and the secondary server 110 may each place a marker in the cache 212 and the cache 312, respectively, to indicate that the epoch has ended. The cache 212 and the cache 312 are flushed to the storage volumes 112 and 114, respectively, only up to their respective markers. In this manner, the state of the storage volume 112 is identical to the storage volume 114 as of the checkpoint. In another embodiment, the primary server 108 and the secondary server 110 share access to the storage volume 112. In such an embodiment, the data generated during the previous epoch is not mirrored onto another storage volume.

On a successful checkpoint, the networking sub-system 214 releases the output data in the buffer for transmission. For example, the networking sub-system 214 may insert a marker in the buffer to capture its state as of the instant of the checkpoint. All of the output data in the buffer before the marker can be transmitted after the checkpoint is complete. In this manner, the complete execution context of the primary server 108 is mirrored by the secondary server 110 as of the checkpoint.

The secondary server 110 is also configured to monitor the status of the primary server 108. For example, the primary server 108 may be configured to periodically send a heartbeat to the secondary server 110. If the secondary server 110 does not detect a heartbeat after a threshold duration has elapsed, the secondary server 110 initiates the failover process. Those skilled in the art will appreciate that other mechanisms may be used to detect failure of the primary server 108 at the secondary server 110. When the primary server 108 fails, the secondary server 110 discards any un-committed changes since the last successful checkpoint. Such changes include intermediate snapshots of dirty pages and intermediate disk changes in the cache 312. In essence, the secondary server 110 rewinds its state to that of the last successful checkpoint. The secondary server 110 then resumes execution from this state.

In one embodiment, the output data maintained in the buffer by the networking sub-system 214 of the primary server 108 is not mirrored on the secondary server 110. After a failure, the secondary server 110 does not re-transmit any of the output data generated by the primary server 108. Rather, the secondary server 110 relies on the error recovery of the networking sub-system to eventually re-transmit output data based on timeouts. Such an error recovery mechanism is part of TCP/IP, for example, as is well known in the art. This applies equally to the received network data that was consumed by the primary server 108 prior to failover. Eventually, the clients 104 will re-transmit packets in response to not receiving acknowledgements from the server cluster 106.

Figure 4:
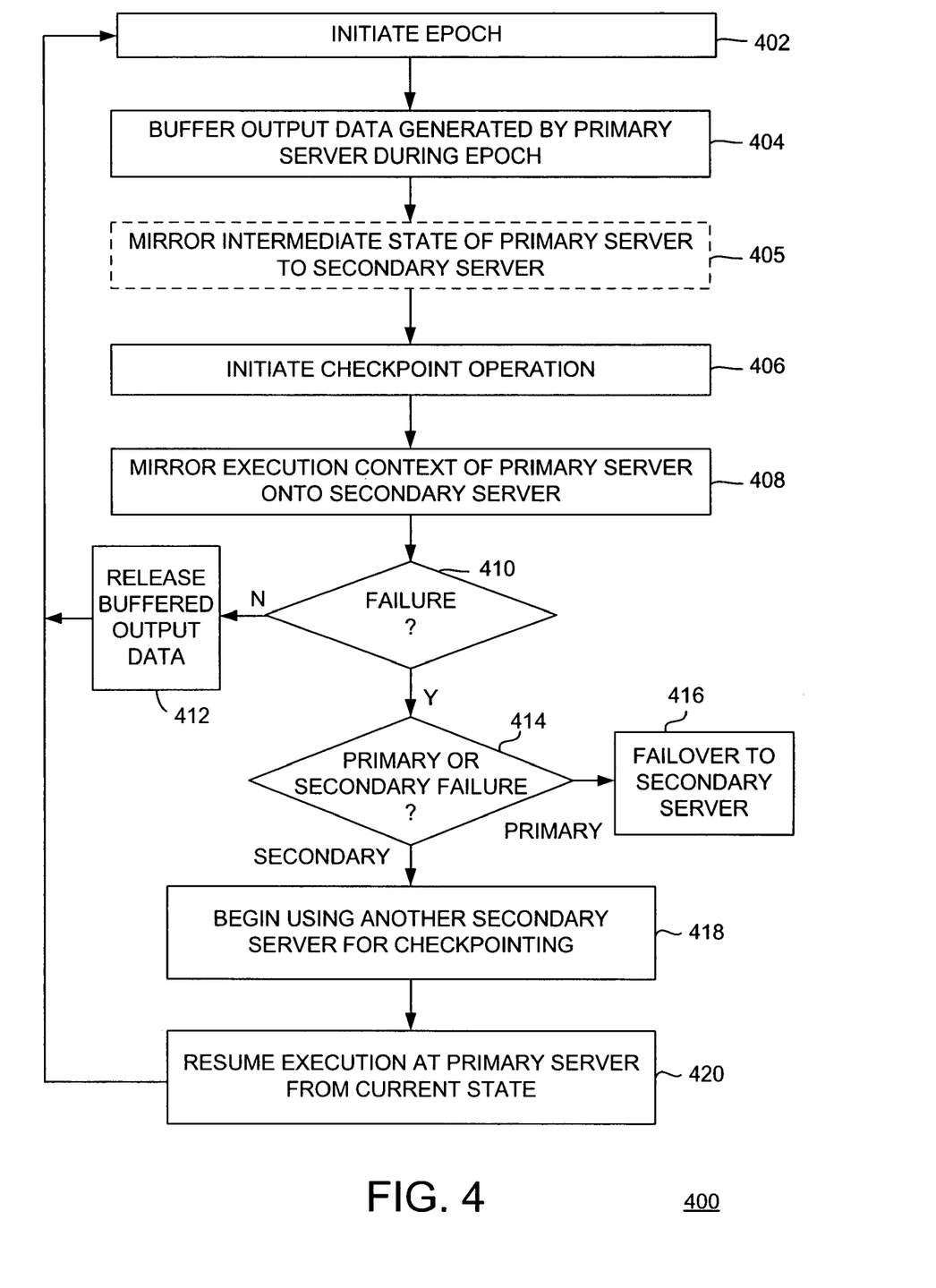
FIG. 4 is a flow diagram depicting an exemplary embodiment of a method of providing fault tolerance in accordance with one or more aspects of the invention.

FIG. 4 is a flow diagram depicting an exemplary embodiment of a method 400 of providing fault tolerance in accordance with one or more aspects of the invention. The method 400 is illustratively performed by a primary server and at least one secondary server in a server cluster. The method 400 begins at step 402, where an epoch is initiated. At step 404, output data produced by the primary server from execution of a service during the epoch is buffered. For example, the output data may include network packets to be transmitted to clients coupled to the primary server via a network. The service may be an e-mail service, a database service, or the like.

At optional step 405, state information of the primary server is mirrored onto the secondary server during the epoch. For example, memory pages that have been changed during the epoch may be copied from the primary server to the secondary server during the epoch. In addition, write requests to a storage volume that have been cached at the primary server may be copied to a cache in the secondary server during the epoch. Notably, the state information mirrored at step 405 is not committed at the secondary server. Rather, such state information comprises intermediate state information that may be committed upon completion of a successful checkpoint operation.

At step 406, a checkpoint operation is initiated. The checkpoint ends the epoch initiated at step 402. At step 408, the execution context of the primary server is mirrored onto the secondary server in response to the checkpoint. That is, a copy of the current execution context of the primary server is established on the secondary server. The execution context includes information required to bring the hardware/software of the secondary server to the same logical state of the hardware/software of the primary server at the instant of the checkpoint. Mirroring of the execution context results in the logical state of the primary server being committed to the secondary server. If intermediate state information was transferred to the secondary server during the epoch at optional step 405, such intermediate state information is committed at step 408. At step 410, a determination is made whether a failure has occurred during the checkpoint process. A failure of either the primary server or the secondary server may prevent the state of the primary server from being successfully committed to the secondary server. If no failure is detected, the method 400 proceeds to step 412.

At step 412, the output data in the buffer produced during the epoch is released for transmission. The method 400 returns to step 402, where another epoch is initiated and the method 400 repeats. If at step 410 a failure has been detected, the method 400 proceeds to step 414. At step 414, a determination is made whether the primary server or the secondary server has failed. If the primary server has failed, the method 400 proceeds to step 416, where failover to the secondary server is initiated. An exemplary process for failing over to the secondary server is described below with respect to FIG. 5. If at step 414 the secondary server has failed, the method 400 proceeds to step 418. At step 418, the primary server begins using another secondary server for checkpointing and checkpoints it current state to the newly selected server. At step 420, the primary server resumes execution from the current state. The method 400 returns from step 420 to step 402, where another epoch is initiated and the method 400 repeats using the other secondary server.

Figure 5:
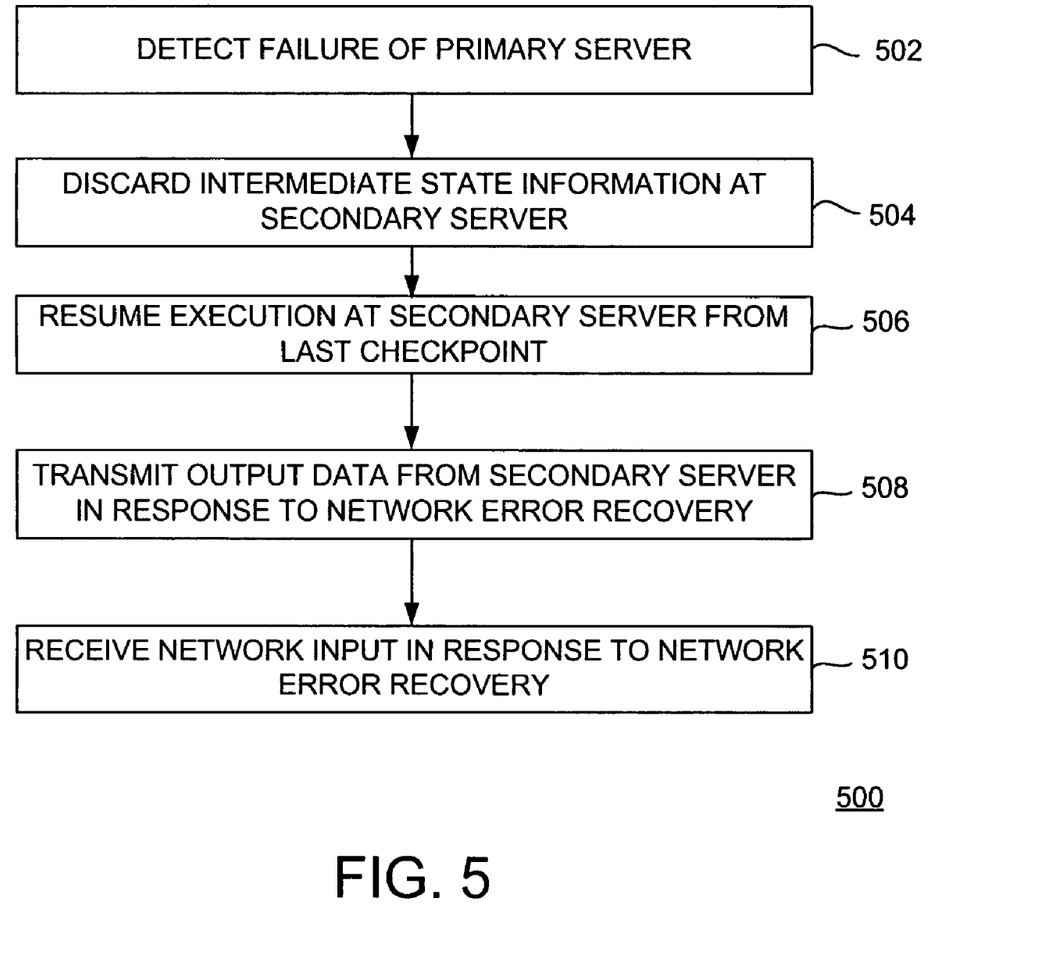
FIG. 5 is a flow diagram depicting an exemplary embodiment of a method for failing over from a primary server to a secondary server in accordance with one or more aspects of the invention.

FIG. 5 is a flow diagram depicting an exemplary embodiment of a method 500 for failing over from a primary server to a secondary server in accordance with one or more aspects of the invention. The method 500 begins at step 502, where the secondary server detects a failure of the primary server. The failure may be hardware and/or software related. At step 504, the secondary server discards any intermediate state information that was mirrored during the epoch in which the failure occurred. At step 506, the secondary server resumes execution from the state as it existed at the last successful checkpoint. In one embodiment, at step 508, the secondary server transmits output data generated by execution of the service on the secondary server based on network protocol error recovery. As described above, the output data generated by the primary server may not be mirrored to the secondary server and thus the secondary server does not re-transmit any of the output data produced by the primary server before failure. Rather, the secondary server relies on the error recovery mechanism of the network protocol, which will cause re-transmission of output data produced by the secondary server. At step 510, the secondary server receives network input generated by at least one client in response to network protocol error recovery. For example, since the primary server has failed, the primary server does not acknowledge network input received from the client(s) before failure. Due to network protocol error recovery, the client(s) will re-send the network data, which will be received by the secondary server.

While the foregoing is directed to embodiments of the present invention, other and further embodiments of the invention may be devised without departing from the basic scope thereof, and the scope thereof is determined by the claims that follow.

What is claimed is:

1. A method of providing fault tolerance, comprising:
   buffering output data generated by execution of a service on the primary server during a current epoch between a first checkpoint and a second checkpoint;
   establishing a copy of an execution context of the primary server on a secondary server in response to the second checkpoint; and
   releasing the output data as buffered from the primary server in response to establishment of the copy of the execution context on the secondary server.

2. The method of claim 1, further comprising:
   detecting a failure of the primary server during a next epoch between the second checkpoint and a third checkpoint; and resuming execution of the service on the secondary server from the execution context in response to the failure.

3. The method of claim 2, further comprising:
mirroring intermediate state information of the primary server onto the secondary server during the current epoch.

4. The method of claim 3, further comprising:
discarding the intermediate state information at the secondary server in response to the failure.

5. The method of claim 3, wherein the intermediate state information includes at least one of: memory pages modified during the current epoch or write requests to a storage volume managed by the primary server.

6. The method of claim 3, wherein the step of establishing comprises:
committing the intermediate state information on the secondary server in response to the second checkpoint.

7. The method of claim 2, wherein the output data comprises network output destined to at least one client in communication with the primary server via a network.

8. The method of claim 7, further comprising:
transmitting output data generated by execution of the service on the secondary server based on error recovery of a network protocol used to communicate the network output.

9. The method of claim 7, further comprising:
receiving, at the secondary server, network input generated by at least one client and received by the primary server during the current epoch in response to error recovery of a network protocol used by the at least one client.

10. The method of claim 1, further comprising:
caching write requests to a storage volume managed by the primary server during the current epoch; and
causing the write requests to be written to the storage volume in response to establishment of the copy of the first execution context on the secondary server.

11. The method of claim 1, further comprising:
mirroring the write requests to the storage volume on the secondary server in response to the second checkpoint.

12. The method of claim 1, further comprising:
tracking modified memory pages of the primary server during the current epoch; and
mirroring the modified memory pages on the secondary server.

13. Apparatus for providing fault tolerance, comprising:
means for buffering output data generated by execution of a service on the primary server during a current epoch between a first checkpoint and a second checkpoint;
means for establishing a copy of an execution context of the primary server on a secondary server in response to the second checkpoint; and
means for releasing the output data as buffered from the primary server in response to establishment of the copy of the execution context on the secondary server.

14. The apparatus of claim 13, further comprising:
means for detecting a failure of the primary server during a next epoch between the second checkpoint and a third checkpoint; and means for resuming execution of the service on the secondary server from the execution context in response to the failure.

15. The apparatus of claim 14, further comprising:
means for mirroring intermediate state information of the primary server onto the secondary server during the current epoch.

16. The apparatus of claim 13, further comprising:
means for caching write requests to a storage volume managed by the primary server during the current epoch;
means for mirroring the write requests to the storage volume on the secondary server in response to the second checkpoint;
means for causing the write requests to be written to the storage volume in response to establishment of the copy of the first execution context on the secondary server.

17. The apparatus of claim 13, further comprising:
means for tracking modified memory pages of the primary server during the current epoch; and
means for mirroring the modified memory pages on the secondary server.

18. The apparatus of claim 13, wherein the output data comprises network output destined to at least one client in communication with the primary server and the secondary server via a network, and wherein the apparatus further comprises:
means for re-transmitting output data generated by execution of the service on the secondary server based on error recovery of a network protocol used to communicate the network output; and
means for receiving, at the secondary server, network input generated by at least one client and received by the primary server during the current epoch in response to error recovery of a network protocol used by the at least one client.

19. A fault tolerant system, comprising:
a primary server configured to execute a service for a plurality of clients;
a secondary server configured to execute the service;
checkpoint engines implemented in the primary server and the secondary server, the checkpoint engines configured to establish a copy of an execution context of the primary server on the secondary server at each of a plurality of checkpoints, buffer output data generated by the primary server between successive ones of the plurality of checkpoints, and release buffered output data in response to establishment of the copy of the execution context at each of the plurality of checkpoints.

20. The system of claim 19, wherein the secondary server is configured to detect a failure of the primary server between a first checkpoint and a second checkpoint of the plurality of checkpoints and resume execution of the service from the execution context of the primary server as established at the first checkpoint.

* * * * *